United States Patent [19]

Isaman

[11] Patent Number: 5,692,170
[45] Date of Patent: Nov. 25, 1997

[54] APPARATUS FOR DETECTING AND EXECUTING TRAPS IN A SUPERSCALAR PROCESSOR

[75] Inventor: David L. Isaman, San Diego, Calif.

[73] Assignee: Metaflow Technologies, Inc., La Jolla, Calif.

[21] Appl. No.: 431,219

[22] Filed: Apr. 28, 1995

[51] Int. Cl.$^6$ ............................................. G06F 13/00
[52] U.S. Cl. ............................. 395/591; 395/733
[58] Field of Search ........................... 395/375, 775, 395/800, 591, 733

[56] References Cited

U.S. PATENT DOCUMENTS

| | | | |
|---|---|---|---|
| 4,179,737 | 12/1979 | Kim | 395/375 |
| 4,912,635 | 3/1990 | Nishimukai et al. | 395/375 |
| 5,136,696 | 8/1992 | Beckwith et al. | 395/375 |
| 5,327,567 | 7/1994 | Johnson | 375/775 |
| 5,394,529 | 2/1995 | Brown et al. | 395/375 |
| 5,442,756 | 8/1995 | Grochowski et al. | 395/375 |
| 5,448,705 | 9/1995 | Nguyen et al. | 395/375 |

FOREIGN PATENT DOCUMENTS

| | | |
|---|---|---|
| 0514092A3 | 11/1992 | European Pat. Off. . |
| 0529305A3 | 3/1993 | European Pat. Off. . |
| WO93/01563 | 1/1993 | WIPO . |

OTHER PUBLICATIONS

C. Melear, "The design of the 88000 RISC family," *IEEE Micro.*, 9(2) :26–38 (Apr. 1, 1989).

J. Smith et al., "Implementing precise interrupts in pipelined processors," *IEEE Transactions on Computers*, 37(5) :562–573 (May 5, 1988).

*Primary Examiner*—David Y. Eng
*Attorney, Agent, or Firm*—Townsend and Townsend and Crew LLP; Henry K. Woodward

[57] ABSTRACT

Apparatus for detecting and executing trapping program instructions in a superscalar processor operating on a plurality of pipelined instructions includes a fetch stage for fetching consecutive instructions from an instruction cache or from main memory, an instruction FIFO memory for storing fetched instructions from the fetch stage, and an instruction decode stage for removing instructions from the FIFO memory in accordance with relative ages of instructions stored in the FIFO memory. The decode stage examines instructions removed from the FIFO memory for trapping conditions, and flushes all younger instructions from the FIFO memory in response to identification of a trap in an instruction. The decode stage distinguishes between hardware traps and software traps. A software trapping instruction is forwarded to an execute stage for execution. The decode stage immediately causes the fetch address to be changed to the appropriate trap handler address.

11 Claims, 4 Drawing Sheets

APPARATUS FOR DETECTING AND EXECUTING TRAPS IN A SUPERSCALAR PROCESSOR

BACKGROUND OF THE INVENTION

This invention relates to the architecture and operation of an improved processor in which trapping conditions are identified at a decode stage to expedite operations in a pipelined superscalar processor.

Conventional processor designs commonly involve the control of instructions in three stages—fetch, decode, execute. In the first stage, an instruction is fetched from memory at a location identified by a program counter which points to the latest fetched instruction, thereby allowing the next instruction to be fetched. Following the fetch, the instruction is checked for possible data dependencies and, if it passes the test, the instruction and its operands are then issued for execution. (Data dependencies are circumstances where an instruction cannot be executed because data for the instruction is not yet available.) The instructions issued can be identified by a virtual-issue program counter. Once an instruction is decoded and issued, it is sent to the execution stage, where it produces a result that is written into either a register file or a memory, thereby altering the state of the processor.

More recent advanced processors include an element called a register scoreboard which checks resources for an instruction to see if the required resources are available for the instruction to execute. If so, the instruction is issued even before the instruction in the execution stage has finished, which can result in out-of-order execution. The register scoreboard records (locks) the resources that would be modified by the instruction at issue time. Any subsequent instructions that want to access those resources cannot be issued until the instruction that initially locked them subsequently unlocks them by updating the resources, and so notifying the processor.

These known processor designs operate with the disadvantage that any stop in the issue of instructions, typically due to resource dependency among instructions, will stop the instruction fetch. This stopping results in loss of performance because fewer instructions are issued for execution.

Further, computer systems define hardware trapping conditions for many types of instructions. A hardware trapping condition is a condition that does not allow producing a meaningful result of execution for that instruction under the current conditions. Hardware trapping conditions typically include: illegal instructions, privileged instructions, protection violations, page faults, invalid results, floating-point instructions in the absence of an optional floating-point processor, and register set overflow.

Hardware trapping conditions are automatically tested by the computer system before and after every instruction execution. If a trapping condition is found, a trap is taken. Taking a trap consists of the steps of preventing the trapping instruction and all those that follow it from affecting the state of the machine, saving the address of the trapping instruction in a specified trap address register well-known to computer designers, setting the mode of the machine to Supervisor (privileged) mode, and switching to fetching instructions from a trap handler. The address of the trap handler is typically determined by concatenating a constant that depends on the type of trapping condition to the contents of a special state register, the Trap Base Register (TBR).

Another form of trap is the software trap. Many computer systems have special instructions, a side effect of which is to force a trap. These are used by a user mode program to request services of the operating system (a "system call"). The steps taken on detecting a software trap are the same as those just described for hardware traps, except that the address of the trap handler is a variable that is computed by the trap instruction itself, rather than a constant.

Almost all computer system implementations are pipelined. In a pipelined implementation, each instruction takes a minimum of five to seven clock cycles to execute completely. A typical sequence of steps is: fetch the instruction from an instruction cache, decode the instruction to determine its resource requirements, read the instruction's operand values from a register file, execute the instruction to produce a result; this takes from one to three clocks, and write back the result to the register file.

In order to keep the hardware maximally utilized, a new instruction enters the pipeline every clock cycle whenever possible. In this way, the instruction completion rate can be as high as one per clock cycle, even though each individual instruction requires several cycles to completely execute.

Some trapping conditions depend on the result of execution, and so cannot be tested until after the execution stage. For these instructions, the test is made during the write-back cycle, in time to prevent updating the register file with the invalid result. Whenever a trapping condition is detected, all instructions executed before the one that traps have been through the write-back stage, and so their results have updated the register file. All instructions that follow the trapping one are still in the pipeline. Taking a trap in a pipelined machine is a simple matter of flushing all instructions from the pipeline and forcing the fetching stage to switch to the trap handler address.

Taking a trap at the write-back stage represents a degree of inefficiency due to the fact that the hardware was applied to the instructions following the trapping one that are flushed. In a conventional processor the number of instructions flushed in taking a trap is approximately equal to the length of the pipeline. This penalty is so small that for simplicity, all traps are handled in the same manner. An instruction that cannot be executed, e.g. because it is unrecognized or privileged, is simply marked as trapping at some earlier stage of the pipeline. This trapping mark accompanies the instruction through the pipeline until it is recognized and acted on at the write-back stage.

In a superscalar out-of-order processor, however, the inefficiency due to taking a trap at the write-back stage is significantly greater. Simply stated, such a processor differs from a conventional pipeline by the insertion of a buffer (the "instruction shelf") after the decode stage and another buffer (the "result shelf") after the execution stage. Each buffer can hold several instructions, each of which is held in the buffer for an indefinite length of time waiting for the right combination of conditions to let it move to the next stage.

In the superscalar processor such as disclosed in U.S. patent application Ser. No. 07/622,893, filed Dec. 5, 1990 for "Processor Architecture Having Decoupled Fetching, Issuing and Updating Operations and Speculative Branching," up to 64 instructions can be held in these buffers between the first (fetch) and last (write-back) stage of the pipeline. Therefore, detecting and acting on a trap at the write-back stage can result in having wasted dozens of clocks of execution bandwidth on instructions that are flushed. Certain types of traps cannot be detected until after the execution stage. For these, the wasted effort is inevitable. But many types of traps can be detected at the fetch or decode stages.

In prior-art out-of-order processors, traps detected at the fetch or decode stages are handled just as in traditional pipelined machines. The instruction is marked as trapping and then launched into the machine like any other. It sits on the instruction shelf waiting for a free execution unit so that it can be moved to the result shelf, where it must wait until all instructions fetched earlier have gone through the writeback stage. During all this time, the fetch and decode stages are continuing to launch instructions that follow the trapping one, even though the decode stage knows that all those following instructions will be flushed.

Many of the types of hardware traps that are detected at the decode stage are of the "shouldn't happen" variety: illegal instructions, privilege or protection violations. Other trap types, like page faults, that are detected at the fetch stage entail such a large overhead in the trap handler that even a few dozen wasted instructions are insignificant. But there is a class of trap—software traps and register set overflows—that are not a programming error, are expected to happen, and entail a low overhead in the trap handler. The cumulative effort wasted while waiting to take traps of this class at the write-back stage in a superscalar out-of-order processor can be significant.

SUMMARY OF THE INVENTION

The present invention encompasses apparatus for detecting and executing program instruction hardware and software traps in a superscalar processor operating on a plurality of pipelined instructions. The apparatus includes fetch means for fetching instructions from an instruction cache or from main memory, an instruction FIFO memory for storing fetched instructions from the fetch means, and an instruction decode means for removing instructions from the FIFO memory in accordance with the relative ages of stored instructions and examining the instructions for trapping conditions. In response to identification of a trap in an instruction, the decode means flushes from the FIFO memory all younger instructions.

In the present invention, whenever the decode stage detects a hardware trapping condition on an instruction, instead of forwarding that instruction to the instruction shelf, it flushes that instruction and all those that have been fetched following that instruction. In the case of a software trap, it forwards only the trapping instruction, in order to get the trap handler address computed, and flushes all following instructions. It saves the address of the trapping instruction in a copy of the specified trap address register. It sets the mode to supervisor mode, switches to a new register set, and forces the fetch stage to start fetching instructions from the trap handler as soon as the trap handler address is known. The trap handler address is given by the concatenation of the trap base register, TBR, and either a constant trap type number for a hardware trap or the result of executing a software trap instruction.

In this invention, the only penalty for taking a hardware trap detected at the decode stage is a small time window during which no instructions are put into the instruction shelf. But because the instruction shelf is a queuing device, there likely are enough instructions already in it at the start of this interval to keep the execution stage busy until the decode stage resumes issuing instructions. The penalty for a software trap is greater, due to having to wait for the trap instruction to get to the execution stage, but the penalty can still be much less than waiting for the trap instruction to get to the Write-back stage.

In order to be able to detect privilege violations at the decode stage, the invention executes the change to and from supervisor mode at the entry and exit of a trap handler in the decode stage, rather than in the execute stage. Similarly, in order to be able to detect register set overflow traps at the decode stage, the invention executes the register set changes made for subroutine call and return in the decode stage, rather than in the execute stage.

The invention and objects and features thereof will be more readily apparent from the following detailed description and appended claims when taken with the drawings.

DESCRIPTION OF THE PREFERRED EMBODIMENT

Figure 1:
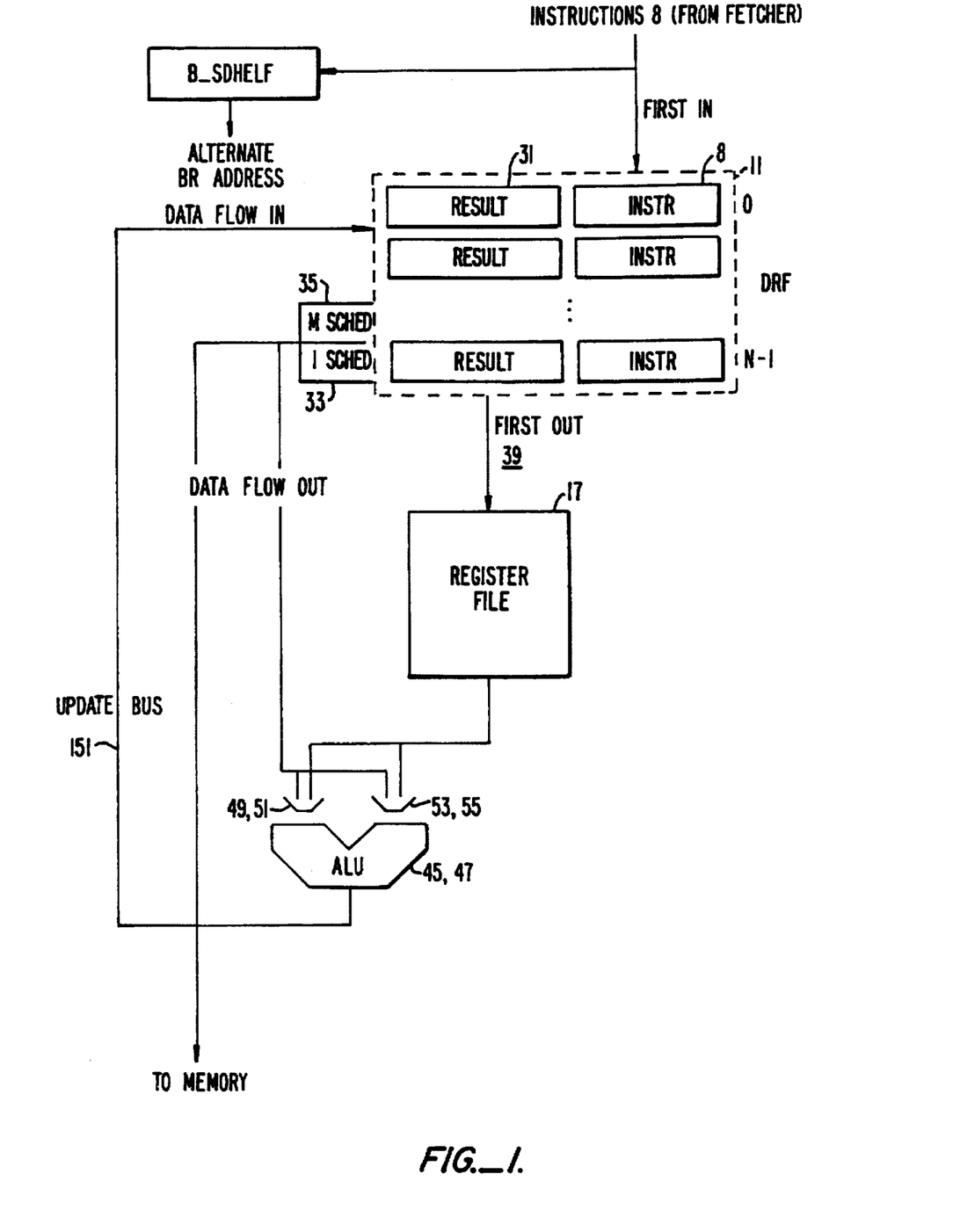
FIG. 1 illustrates the primary data flow of a simplified diagram of the architecture of a superscalar processor in which the invention can be employed.
Figure 2:
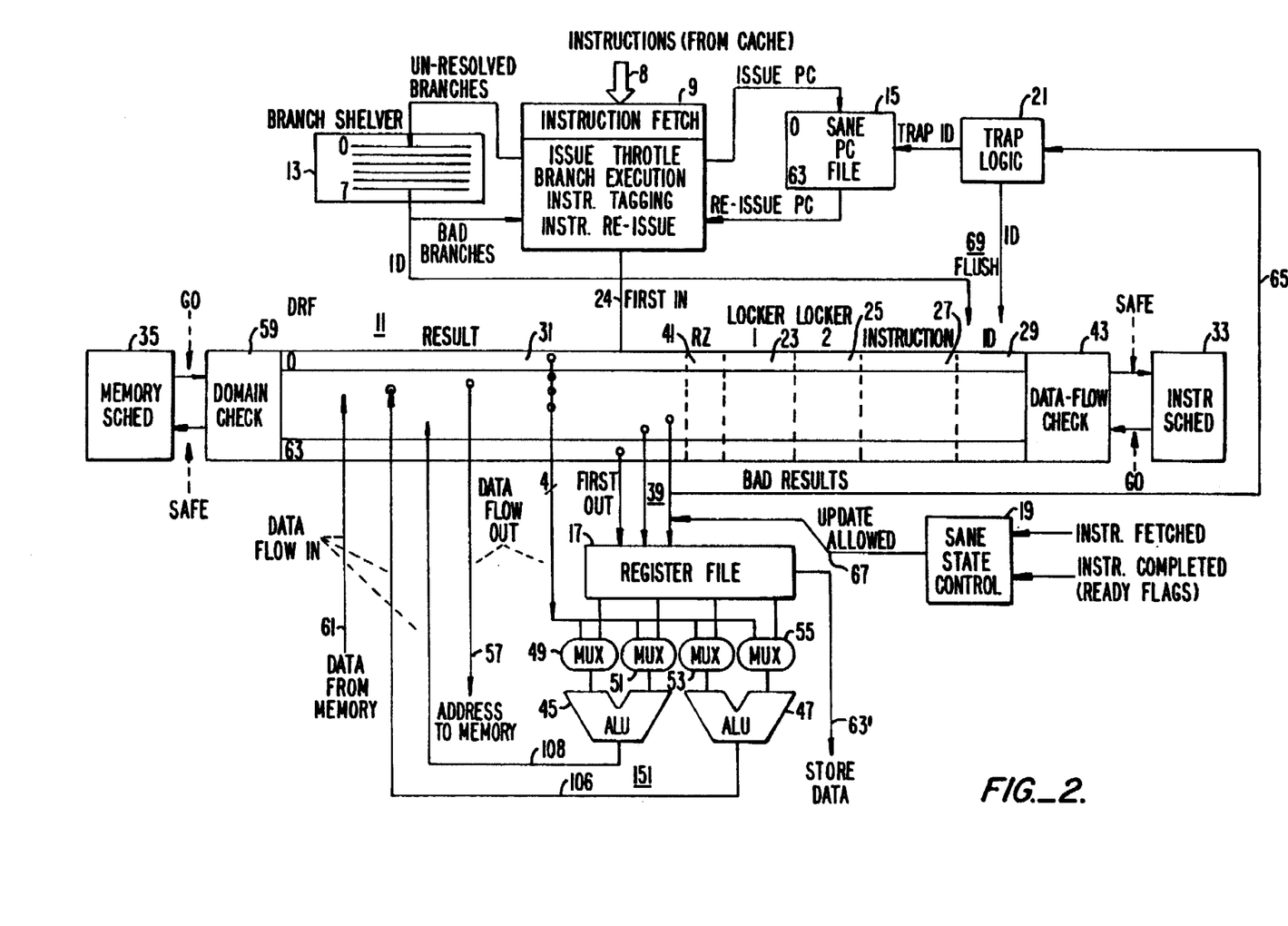
FIG. 2 is a block diagram including additional components of the architecture.
Figure 3:
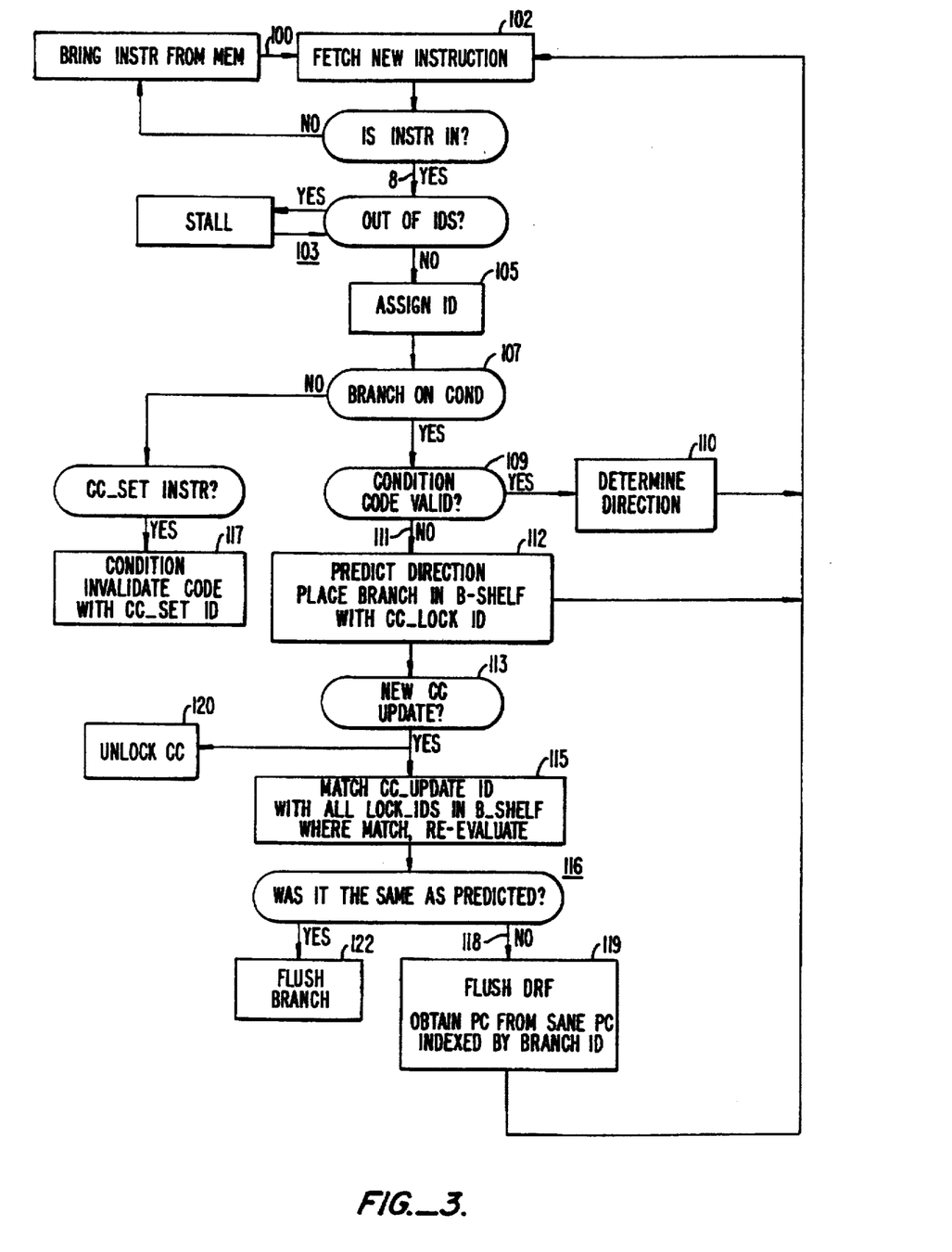
FIG. 3 is a flow chart illustrating branch execution operation.

The block diagrams of FIGS. 1 and 2, and the flow chart of FIG. 3, are an architectural overview of the processor disclosed in copending application Ser. No. 07/622,893, supra. The instruction fetcher 9 (see FIGS. 2 and 3) preferably is coupled to a well-known instruction cache memory (not shown), and receives instructions 8 from the cache memory. Among other functions, the fetcher 9 performs a "throttling" function. For example, if an instruction cannot be fetched from the instruction cache, then the fetcher 9 operates to bring an instruction from the main instruction memory (not shown) for transfer 100 to the instruction cache. Once in the cache the instruction is fetched 102. Other examples of "throttling" functions performed by the fetcher 9 include managing instructions that require multiple clock cycles to dispatch, and managing instructions that cannot be fetched for some reason, for example, identification codes that are not available for assignment to an instruction 103.

As shown in FIG. 2 the fetcher 9 supplies the dynamic register file 11 with the instructions fetched from cache. The dynamic register file holds all non-branch instructions pending within the processor. As the instructions 8 are fetched from cache, they are assigned 105 an identification code 29, or ID, by a counter (not shown) which assigns strictly sequential ID values to each instruction that is fetched in the order fetched. These sequential IDs contain a "color" bit which is the most significant bit, and is used for magnitude comparisons. By comparing the color bits, and, if necessary, the magnitudes of two instruction IDs, the instruction fetched earlier can be determined. This provides an "age" comparison between two instructions, that is, it provides the relative order of when the instructions 8 were fetched from memory.

As shown in FIG. 2, the fetcher 9 also manages branch execution in a manner so that the fetcher 9 does not stop if a branch cannot be executed. For a branch to be executed, it must have valid condition codes 109. The condition codes are set by instructions that modify the condition codes. Thus, at the time when an instruction that modifies condition codes is dispatched, the fetcher 9 invalidates 117 a condition code register by putting a locked bit on it. The fetcher stores the ID of the instruction that locked the condition code. The condition code stays locked until that instruction finishes execution and updates 113 the condition code register, thereby unlocking 120 the condition code.

The content of the condition code register is termed "insane" herein when it does not reflect the state of the processor when updated sequentially, like the register file and memory. For the time when the condition codes are locked 117, there is an instruction that indicates the need to modify the condition code. This prevents a following branch from using the condition code to make a decision. Therefore, the fetcher puts such a following branch instruction in branch shelver 13 together with the ID of the instruction that locked the condition code 112. Only the result of that locking instruction provides valid condition codes for the branch.

In the branch shelver 13, the branch instruction waits until the condition codes become available, i.e., the branch instruction waits until the instruction that locked the condition codes completes execution and updates the condition codes. When a branch is shelved, the fetcher 9 will decide 112, based on prediction bits, which direction down the instruction stream to proceed from that location, in other words, the most probable direction for continued execution of the program. The fetcher 9 will continue to fetch instructions "on speculation" along the predicted path. When the condition codes that a shelved branch instruction is waiting on become valid, then the branch decision is re-evaluated 115 and compared 116 with the initial decision. If that comparison indicates that the branch was properly executed, it is removed 122 from the shelf. If the decisions are different on comparison 118, the predicted decision was wrong and the processor must proceed along another not predicted branch. Therefore, the program must resume execution from the branch instruction in another direction.

For the processor to change direction following an incorrectly predicted branch decision 118, the processor must be restartable at any point. For example, assume that there are N instructions allowed in the processor and that there are instructions which are fetched, but not executed. The processor must be able to restart with any instruction that is in the dynamic register file, i.e., any instruction that has not updated the state of memory yet. That function, called restarting, is accomplished with the help of a program counter file, herein termed the "sane" program counter file 15, which is an N-entry register file that contains the addresses of the instructions in the dynamic register file 11, indexed by their IDs. If the processor needs to restart by re-fetching a branch instruction, the ID of the branch is used to index into the sane program counter file 15 and obtain its program counter 119. That program counter is used to restart the processor from that point forward.

In the case 118 when the branch was predicted incorrectly, some number of instructions were put into the execution stream and may have generated results which are in the dynamic register file 11, but have not yet updated the register file 17. They have not been allowed to reach completion by the sane state controller 19 because they are speculative. Upon determination that a branch was incorrectly predicted, a flushing mechanism flushes 119 from the dynamic register file 11 all instructions and their results that were executed in reliance on the incorrect prediction.

The sane state controller 19 receives from the branch shelver 13 the ID of the shelved branch instruction, or in the case of multiple shelved branches, the ID of the oldest of all the shelved branches (as determined by the order in which they were fetched). The sane state controller 19 does not allow instructions which have an ID that is more recent than the ID of the oldest shelved branch to update the state of the processor, and therefore stops the completion of instructions at that point. This enables the processor to maintain its sane condition by not allowing the speculative results to alter the state of the processor.

The processor may also restart after it encounters a trap condition or an external interrupt. The processor includes trap logic 21 which provides the states of the processor at the point of encountering a trap condition. The ID of the trapping instruction is used to obtain the program counter from the sane program counter file 15.

Figure 4:
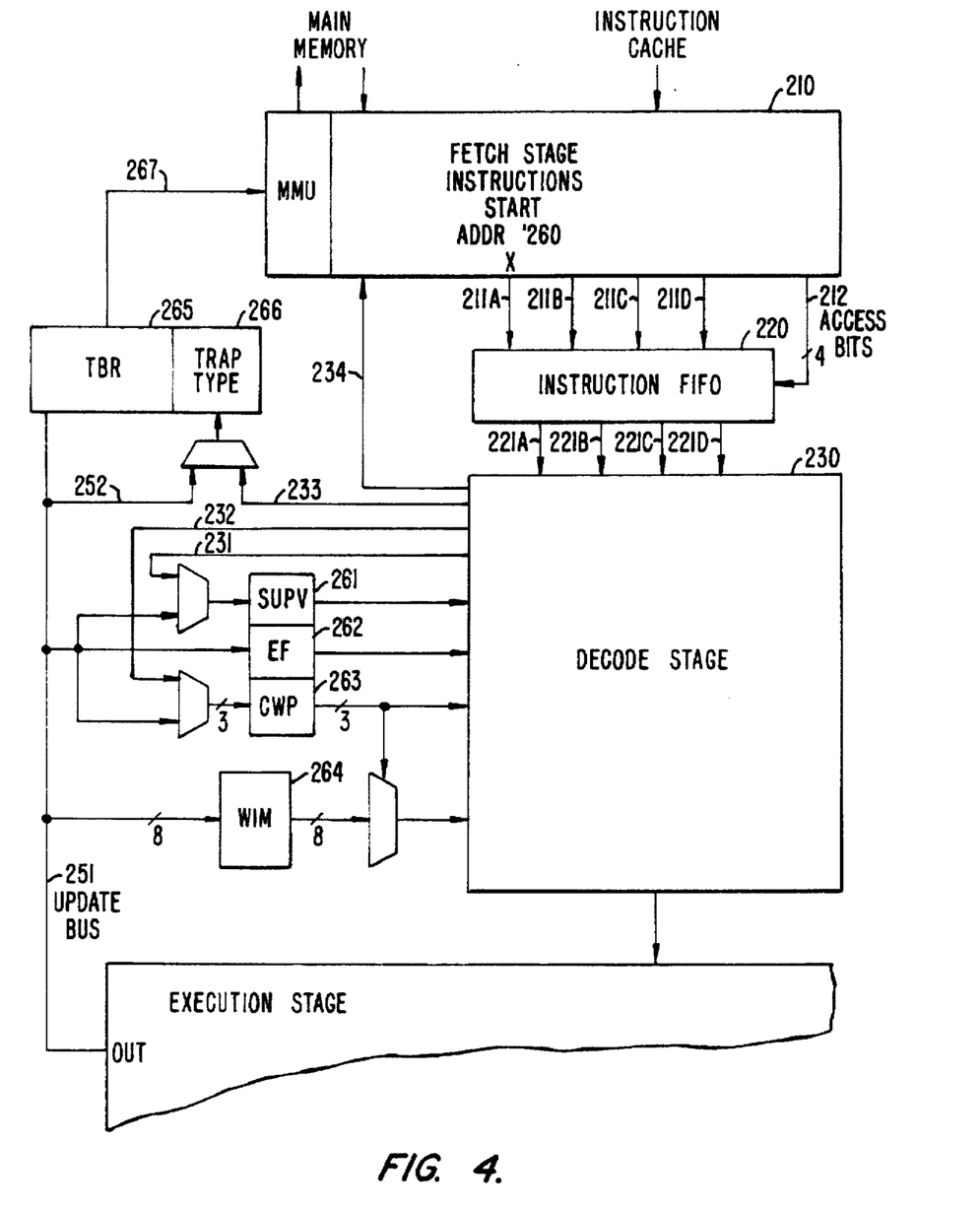
FIG. 4 illustrates a schematic block diagram of apparatus for handling faults in accordance with the invention.

Referring now to FIG. 4, a schematic block diagram is illustrated of apparatus for handling faults in accordance with the invention. The major components include the Fetch stage 210, the Instruction FIFO 220, the Decode stage 230, and the following "State registers": the Supervisor register 261, the Enable Floating-point (EF) register 262, the Current Window Pointer (CWP) 263, the Window Invalid Mask (WIM) 264, the Trap Base Register (TBR) 265, and the Trap Type register 266.

As described above, the Fetch stage fetches instructions from either an Instruction Cache or main memory (not shown). It outputs up to four instructions per clock cycle over wires 211A–D, fetched from consecutive addresses starting at the Fetch Address 260. The Fetch stage also implements a Memory Management Unit (MMU) function. The MMU function divides the main memory address space into pages. It assigns certain attributes to each page. Those that are pertinent to the present invention include:

1. Was there a physical memory error encountered in attempting to fetch this instruction?

2. Is a copy of the page currently in main memory?

3. Is it permitted to fetch instructions from that page?

4. Is it permitted to execute instructions fetched from that page when not in supervisor mode (i.e. when Supervisor bit 261 is 0).

Since all four instructions output by the Fetch stage at a clock cycle are constrained to be on the same page, the Fetch stage outputs a single set of four Access bits 212, one indicating the answer to each of the above questions for the page containing those instructions.

The Instruction FIFO 220 holds up to five instructions, along with the Access bits and address for each instruction. The instructions in the FIFO are considered to be ordered by "age". That is, the instruction at the head of the FIFO, which will be removed first, is the "oldest", while the instruction at the tail, which will not be removed before any others, is the "youngest". The Decode stage 230 removes from zero to four instructions from the head (the oldest instructions) each clock cycle. The Fetch stage 210 writes as many instructions as it can each clock cycle, considering the number of instructions that the Fetch stage has available and the number of empty locations at the tail of the FIFO after the removals from the head.

The instruction 211A at the Fetch stage whose address is the Fetch Address 260 is considered the oldest, and will be the one added to the FIFO if only one is added. If a second instruction is added to the FIFO, it will be the one 211B at the next higher address, and so on. The FIFO is also capable of being completely flushed, removing every entry. All of the instructions added at a clock cycle get a copy of the four Access bits input on wires 212. The Instruction FIFO also keeps track of the address of each instruction stored in it.

The Decode stage examines in parallel the four oldest entries in the Instruction Decode FIFO 221A–D. 221A is the oldest, 221D the youngest. For each entry that contains an instruction, the Decoder stage determines the presence of any of several possible trapping conditions. It also looks for any non-trapping instruction that modifies one of the state registers on which the Decode stage depends: the Supervisor bit, the EF bit, the CWP, the WIM, or the TBR.

These state registers are modified by two classes of instructions. The State-register-writing instructions perform an operation on the contents of arbitrary general-purpose registers and write the results of that operation to one of the state registers (in the preferred embodiment, all three of the Supervisor, EF, and CWP registers 261–263 are written by a single State-register-writing instruction). The second class of instructions that modify state registers are the incremental modifiers. These either set the register to a constant or modify the current value by a constant.

Specifically, in the preferred embodiment, the Supervisor bit 261 is modified as a side effect of the Return from Trap (RETT) instruction, which sets that bit to 0. The Current Window Pointer, 263, which is a three-bit index indicating which register set is in use, is decremented by one as a side effect of the Save instruction (typically executed on a subroutine call). The Restore instruction executed at a subroutine return has the side effect of incrementing the CWP 263 by one, as does the RETT instruction.

The Decode stage 230 checks each of the four instructions 221A–D to see if it modifies one of the State registers. If any of the instructions writes certain of these State registers, then certain other instructions following that one cannot have their trapping conditions evaluated until the result of the State-register-writing instruction is known. Therefore, the Decode stage will not issue any such instruction following such a State-register-writing instruction until that latter instruction's result is available at the output of the Execution stage.

The present invention detects the availability and value of the result of a State-register-writing instruction for which it is waiting by taking advantage of the fact that each instruction is assigned an instruction ID by the Decode stage, as described above. This ID is guaranteed to be unique for each instruction that has cleared the Decode stage and has not yet cleared the Execution stage. Whenever the Decode stage issues a State-register-writing instruction, it records the fact that the register to be written is locked, i.e. the register cannot be accessed since its correct contents are unknown. The Decode stage also records the ID of the State-register-writing instruction, known as the locker ID of that State register.

The Update bus 251 comes from the output of the Execution stage. The Update bus consists of a Valid bit which is 1 just when the Update bus carries the result of an instruction, the ID of that instruction, and the result of executing that instruction. Whenever the Decode stage sees a Valid bit of 1 on the Update bus 251, it compares the ID on that bus against the locker ID of any locked State register. If a match is detected, the Decode stage copies the correct new value from the appropriate bits of the Update bus into the appropriate locked State register and resets the locked condition.

If any of the four instructions 221A–D examined by the Decode stage is an incremental modifier of a State register, the Decode stage itself executes that instruction. It does so by reading the current value of the corresponding physical State register 261 or 263 and then applying the modification indicated by the instruction. The modified value is used both to evaluate potential trapping conditions for any younger instruction among the four during this clock cycle and to update the physical register 261 or 263 at the end of the clock cycle at which that instruction is issued.

For example, if the third oldest instruction 221C is a privileged instruction, which cannot be executed unless in Supervisor mode, and the physical Supervisor register 261 contains a 1, then the instruction does not have a trapping condition unless an older instruction (221A or 221B) is a RETT instruction, which has the side effect of setting the Supervisor mode to 0. If, e.g., 221A is a RETT instruction, then the trapping condition of 221C is indicated because there is an older RETT instruction in the FIFO, until such time as the instruction 221A is removed from the FIFO by issuing it. At the clock at which that oldest RETT instruction is removed, the physical Supervisor register 261 is set to 0 via wire 231, so that on subsequent clocks, that privileged instruction will be seen to have a trapping condition, based on the contents of the physical register 261 being 0.

If the Decode stage detects more than one instruction among 221A–D that incrementally modifies the same State register 261 or 263, it processes them one at a time. For example, if the CWP register 263 contains the number four, 221A is a Save instruction, and 221C is a Restore instruction, then 221C and all following instructions are ignored until the instruction in 221A is removed. That is because the correct value of CWP for the instruction in 221D is four: the value in register 263, decremented by one by the Save instruction in 221A, and then incremented by one by the Restore in 221C. But the actual value seen by instruction 221D is five: the value in register 263 incremented by the Restore in 221C.

At most one instruction that incrementally modifies a given State register can be issued per clock cycle. In the example, 221C cannot be issued until after 221A has been issued, which updates the physical CWP register 263 to three via wire 232. On subsequent clocks, then, the Restore instruction will add one to the new contents of the CWP register 263, three, yielding the correct value of four for the instructions following the Restore instruction.

The trapping conditions detected at the Decode stage must be prioritized, as more than one condition could be satisfied by the same instruction. The conditions detected are listed below, in order of decreasing priority, along with the manner in which they are determined. For any condition that depends on the value of a State register, the value used is that in the corresponding physical register 260–264, incrementally modified by any older instruction among the four, unless that State register is locked. If a State register on which an examined instruction depends is locked, then the dependent instruction and those following it are held in the FIFO until the State register becomes unlocked.

1. Physical memory access error. This is detected by the fetch stage and output on one of the Access wires 212 when the instruction is fetched.

2. Page fault. This is detected by the fetch stage and output on another one of the Access wires 212 when the instruction is fetched.

3. Privilege violation. This is signalled by a third Access bit 212 output by the Fetch logic indicating that no instruction on the page can be executed unless in Supervisor mode, and the Supervisor bit being 0.

4. Protection violation. This is detected by the fetch stage and output on the fourth of the Access wires 212 when the instruction is fetched.

5. Privileged instruction. This is detected by decoding the instruction to determine that it is one of those that can never be executed unless in Supervisor mode (regardless of the page from which it was fetched) and the Supervisor bit is 0.

6. Illegal instruction. This is detected by decoding the instruction to determine that it is not a defined instruction.

7. Floating-point disabled. This is detected by decoding the instruction as a floating-point instruction and the EF bit 262 is 0.

8. Window overflow. This is detected by adding one to the contents of the CWP register 263 and using the result as a bit index into the WIM register 264; a trapping condition is indicated by a 1 in the indexed bit position of the WIM.

9. Window underflow. This is detected by subtracting one from the contents of the CWP register 263 and using the result as a bit index into the WIM register 264; a trapping condition is indicated by a 1 in the indexed bit position of the WIM.

10. Software trap.

Whenever the Decode stage 230 detects one of the above trapping conditions on any of the instructions 221B–D that is not the oldest instruction, the Decode stage will not issue that or any younger instructions. It will issue all the instructions older than the oldest trapping instruction in the normal fashion.

As soon as the Decode stage detects that the oldest instruction 221A has a hardware trapping condition, the Decode stage starts performing the following actions:

1. Wait, if necessary, for the CWP register to become unlocked, then decrement its current value by one via wires 232 and force the Supervisor register content 261 to a 1 via wire 231.

2. Formulate and issue a pseudo-instruction containing the address of that oldest instruction in the FIFO. The effect of executing this pseudo-instruction is to save that trapping instruction address into the general-purpose register location.

3. Flush the entire Instruction FIFO 220, thereby deleting just the trapping instruction and all those that follow it.

4. Determine the correct code for the highest-priority trapping condition that holds for the oldest instruction, and write that code into the Trap Type register 266 via wires 233.

5. Wait, if necessary, for the Trap Base Register to be unlocked, then signal the Fetch stage, via wire 234, to update the Fetch Address 260 to be equal to the value on wires 267, which is the concatenation of the contents of the Trap Base Register 265 and the Trap Type register 266.

As soon as the Decode state detects that the oldest instruction 221A has a software trapping condition, the Decode stage performs the same Steps 1 and 2 above, followed by the following steps:

3. Issue the oldest instruction 221A, recording its instruction ID, and flush the remaining instructions from the Instruction FIFO.

4. Monitor the Update bus 251 waiting for a Valid signal concurrent with an instruction ID matching the recorded ID of the trapping instruction. When that happens, capture the correct code from the data portion of the Update bus and write it into the Trap Type register 266 via wires 252, followed by the same step 5.

The identification of trap conditions in instructions at the decode stage and the use of state registers to identify trap conditions expedites the handling of traps while reducing execution bandwidth wasted on instructions following a trapping condition and which must be flushed. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of responding to trapping conditions in a pipelined superscalar computer, said computer comprising several processing stages including a decode stage for examining at each clock cycle one or more instructions from a sequence of instructions and a plurality of state registers coupled to the decode stage for indicating the operating state of the computer, and an execution stage coupled to said decode stage for receiving decoded instructions supplied by the decode stage, assessing whether any of said decoded instructions satisfies any of a first set of trapping conditions, and performing a specified trap action for any instruction that does satisfy any of said set, said method comprising the steps at the decode stage of:

a) assessing whether any instruction being examined at the decode stage satisfies any of a second set of issue-time trapping conditions, said second set of issue-time traps being a subset of and disjointed from said first set of trapping conditions; and b) when any instruction so assessed at the decode stage is determined to satisfy one of said second set of issue-time trapping conditions, then performing at the decode stage the substeps of:

(i) preventing the first such instruction in said sequence, as well as all of the one or more instructions that follow said first such instruction in said sequence, from being supplied to the execution stage; and (ii) performing a specified trap action without waiting for completion of all previously issued instructions in the execution stage.

2. The method according to claim 1 in which said computer includes a fetch stage for reading in each clock cycle one or more instructions from an instruction memory at consecutive addresses starting with that contained in a fetch address register; and said specified trap action includes forcing the address contained in said fetch address register to be a trap handler address.

3. The method according to claim 2 in which:

said fetch stage includes an instruction buffer, coupled to the instruction memory and to the decode stage;

the fetch stage writing one or more of the instructions that it reads from the instruction memory in a clock cycle into said instruction buffer at the end of that cycle;

the one or more instructions from said sequence examined by the decode stage at each clock cycle being among those contained in the instruction buffer; and said trap action including the further step of emptying the instruction buffer and preventing any more instructions from being written into the instruction buffer before said fetch-address-forcing step has been completed.

4. The method according to claim 2 in which:

each member of said set of trapping conditions has a relative priority, said trap handler address is a function of the highest priority among all the trapping conditions satisfied by said first such instruction in said sequence, and when said first such instruction in said sequence satisfies any issue-time trapping condition, then the highest priority among all the trapping conditions satisfied by said first such instruction is an issue-time trapping condition.

5. The method according to claim 4 in which the specified trap action includes the further step of writing into a trap type register a number uniquely identifying said highest priority among all the trapping conditions satisfied by said first such instruction in said sequence.

6. The method according to claim 2 in which said specified trap action includes the further step of writing the instruction memory address from which was read said first such instruction into a trap address register.

7. The method according to claim 6 in which the decode stage performs said further step by creating and supplying to the execution stage a pseudo-instruction containing said instruction memory address, said pseudo-instruction causing the execution stage to write the instruction memory address into the trap address register.

8. The method according to claim 1 in which said computer includes a plurality of state registers coupled to the decode stage for indicating the operating state of the computer, each issue-time trapping condition depending on values in said state registers, and said assessing step includes examining the contents of the state registers.

9. The method according to claim 8 in which, for each state register, certain instructions in said sequence of instructions modify said state register, and the value in said state register used in assessing the trapping conditions for any instruction in said sequence depends only on the result of executing the instruction most immediately preceding said instruction in said sequence that modifies said state register.

10. The method according to claim 9 and including the further steps of:

c) recognizing all instructions among said instructions examined at the decode stage that modify any of the state registers upon which depend any issue-time trapping conditions; and d) for any modifying instruction so recognized, refusing to supply from the decode stage to the execution stage any instruction following said modifying instruction in said sequence whose trapping conditions depend on any of the state registers modified by said recognized modifying instruction, until such time that the results of the modifying instruction have been written into said state registers.

11. The method according to claim 9 and including the further step of:

(c) recognizing among said one or more instructions examined at the decode stage certain of the instructions that modify state registers upon which depend any issue-time trapping conditions; and the assessing step including for any of said instructions examined, considering the effect on the state register values of any modifying instruction so recognized that precedes said assessed instruction in said sequence.

* * * * *